US009151328B2

(12) United States Patent
Chudo et al.

(10) Patent No.: US 9,151,328 B2
(45) Date of Patent: Oct. 6, 2015

(54) CONICAL ROLLER BEARING

(71) Applicant: JTEKT CORPORATION, Osaka-shi, Osaka (JP)

(72) Inventors: Ryosuke Chudo, Novi, MI (US); Motoshi Kawamura, Kitakatsuragi-gun (JP); Yoshihito Nakashima, Kariya (JP)

(73) Assignee: JTEKT CORPORATION, Osaka (JP)

( * ) Notice: Subject to any disclaimer, the term of this patent is extended or adjusted under 35 U.S.C. 154(b) by 13 days.

(21) Appl. No.: 14/051,075

(22) Filed: Oct. 10, 2013

(65) Prior Publication Data

US 2015/0104126 A1    Apr. 16, 2015

(51) Int. Cl.
F16C 33/46    (2006.01)
F16C 33/54    (2006.01)
F16C 19/36    (2006.01)

(52) U.S. Cl.
CPC ........... *F16C 33/4605* (2013.01); *F16C 19/364* (2013.01); *F16C 33/46* (2013.01); *F16C 33/543* (2013.01)

(58) Field of Classification Search
CPC ............. F16C 33/3806; F16C 33/4605; F16C 19/364; F16C 33/4614; F16C 33/4623; F16C 33/4629; F16C 33/54; F16C 33/542; F16C 33/543
USPC .................................................. 384/560, 572
See application file for complete search history.

(56) References Cited

U.S. PATENT DOCUMENTS

| 4,824,265 | A | * | 4/1989 | Hofmann et al. | 384/560 |
| 5,096,310 | A | * | 3/1992 | Meining et al. | 384/539 |
| 2002/0054722 | A1 | * | 5/2002 | Vignotto et al. | 384/559 |
| 2011/0123142 | A1 | * | 5/2011 | Mason et al. | 384/571 |

FOREIGN PATENT DOCUMENTS

| DE | 3 524 063 A1 | 1/1987 |
| JP | Y2-58-50094 | 11/1983 |
| JP | B2-3728544 | 12/2005 |
| JP | B2-4009047 | 11/2007 |
| JP | A-2009-264576 | 11/2009 |

OTHER PUBLICATIONS

Mar. 14, 2014 Extended European Search Report issued in European Application No. 13188233.4.

* cited by examiner

*Primary Examiner* — Alan B Waits
(74) *Attorney, Agent, or Firm* — Oliff PLC

(57) ABSTRACT

The conical roller bearing includes an inner ring which includes an annular groove between an inner-ring-side raceway surface and a small-diameter-side end portion thereof, and a cage which includes an erected portion extending from a first annular portion of the cage towards the annular groove. The erected portion includes a first inclined portion and a second inclined portion. The first inclined portion is inclined towards conical rollers disposed in pockets of the cage while extending from the first annular portion towards the annular groove. The second inclined portion is inclined towards the small-diameter-side end portion while extending from the first inclined portion towards the annular groove. The second inclined portion is configured to be brought into engagement with the annular groove in an axial direction of the inner ring.

1 Claim, 4 Drawing Sheets

CONICAL ROLLER BEARING

BACKGROUND

The present invention relates to a conical roller bearing in which an inner ring, conical rollers and a cage are fitted together into an assembly.

For example, the assembling of constituent parts into a conical roller bearing 100 shown in FIG. 4 (Patent Literature 1) is carried out as follows: a plurality of conical rollers 140 are aligned on an inner-ring-side raceway surface 121 of an inner ring 120, a cage 130 is fitted from an outer circumferential side of the plurality of conical rollers 140 which are arranged into a ring shape, a first annular portion 131 at a small-diameter side of the cage 130 is crimped radially inwards so that the conical rollers 140 are made difficult to be disengaged from the cage 130, and an outer ring 110 is fitted from the outer circumferential side of the plurality of conical rollers 140 which are arranged into the ring shape.

The inner ring 120, the conical rollers 140 and the cage 130 are prevented from being disassembled by crimping the annular portion 131 at the small-diameter side of the cage 130 radially inwards, whereby those constituent parts are fitted together into an assembly. By fitting them together into the assembly, the inner ring 120, the conical rollers 140 and the cage 130 can be transported as an assembly without the outer ring 110.

In the event that the first annular portion 131 at the small-diameter side of the cage 130 is crimped radially inwards too much, the conical rollers 140 may be brought into contact with pockets 134 to thereby prevent the smooth rolling of the conical rollers 140.

As a countermeasure against the aforesaid problem, there is provided a conical roller bearing 200 shown in FIG. 3 (Patent Literature 2). The assembling of constituent parts into the conical roller bearing 200 is carried out as follows: a plurality of conical rollers 240 are aligned on an inner-ring-side raceway surface 221 of an inner ring 220, a cage 230 is fitted from an outer circumferential side of the plurality of conical rollers 240 which are arranged into a ring shape, an erected portion 231 at a small-diameter side of the cage 230 is deformed so as to ride over a small-diameter end portion 223, a radially inner side of the erected portion 231 is brought into engagement with an annular groove 223a in an axial direction of the inner ring 220, and an outer ring 210 is fitted from the outer circumferential side of the plurality of conical rollers 240 which are arranged into the ring configuration.

In this conical roller bearing 200, the inner ring 220, the conical rollers 240 and the cage 230 are prevented from being disassembled by bringing the erected portion 231 into engagement with the annular groove 223a in place of crimping the cage 230 radially inwards, whereby the inner ring 220, the conical rollers 240 and the cage 230 are fitted together into an assembly. The inner ring 220, the conical rollers 240 and the cage 230 can be transported as an assembly without the outer ring 210 by those constituent parts being fitted together into the assembly.

In order to allow a radially inward distal end of the erected portion 231 to ride over the small-diameter end portion 223, the cage 230 needs to be formed from a resin so as to allow the erected portion 231 to be bent largely. Because of this, there is imposed a limitation on the cage 230 that the cage 230 has to be formed from a resin, leading to fears that the erected portion 231 is damaged at a root thereof.

[Patent Literature 1] JP-B-4009047
[Patent Literature 2] JP-Y-58-50094

SUMMARY

It is therefore one advantageous aspect of the present invention to provide a conical roller bearing which is free from a limitation on the material of a cage to thereby be made free from fears that the cage is damaged when it rides over a small-diameter end portion of an inner ring.

According to one aspect of the invention, there is provided a conical roller bearing comprising:
an outer ring having ring shape;
an inner ring, having ring shape, and disposed on an inner circumferential side of the outer ring;
a cage, disposed between the outer ring and the inner ring, and including a plurality of pockets arranged circumferentially at equal intervals; and
a plurality of conical rollers, disposed individually in the pockets,
wherein
the outer ring includes on an inner circumference thereof an outer-ring-side raceway surface on which the conical rollers roll,
the inner ring includes an inner-ring-side raceway surface on which the conical rollers roll on an outer circumference thereof, a small-diameter-side end portion which is provided at a small-diameter side across the inner-ring-side raceway surface, and a large-diameter-side end portion which is provided at a large-diameter side across the inner-ring-side raceway surface,
the cage includes a first annular portion which has a ring shape and is provided in a position corresponding to the small-diameter-side end portion on one side of the pockets in an axial direction of the inner ring, a second annular portion which has a ring shape and is provided in a position corresponding to the large-diameter-side end portion on the other side of the pockets in the axial direction, and pillar portions which are provided individually on circumferential both sides of the pockets,
the conical rollers are individually brought into engagement with the pockets in a position lying further radially outwards than a rotational center of the conical rollers,
the inner ring includes an annular groove between the inner-ring-side raceway surface and the small-diameter-side end portion,
the cage includes an erected portion which extends from the first annular portion towards the annular groove,
the erected portion includes a first inclined portion which is inclined towards the conical rollers while extending from the first annular portion towards the annular groove, and a second inclined portion which is inclined towards the small-diameter-side end portion while extending from the first inclined portion towards the annular groove, and
the second inclined portion is configured to be brought into engagement with the annular groove in the axial direction of the inner ring.

DETAILED DESCRIPTION OF EXEMPLIFIED EMBODIMENTS

Figure 1:
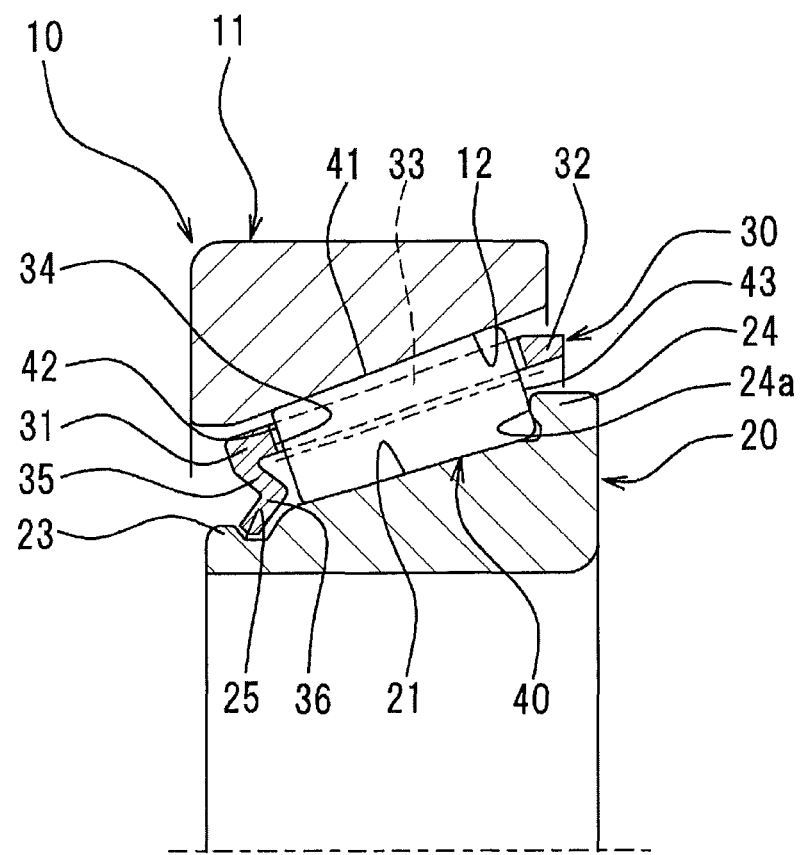
FIG. 1 is a sectional view of a conical roller bearing according to an embodiment of the invention.

An embodiment of the invention will be described by reference to FIGS. 1 to 2. FIG. 1 is sectional view of a conical roller bearing, and FIG. 2 is a sectional view of the conical roller bearing which shows an operating state thereof in which a cage moves in an axial direction to thereby be brought into engagement with an annular groove.

Figure 2:
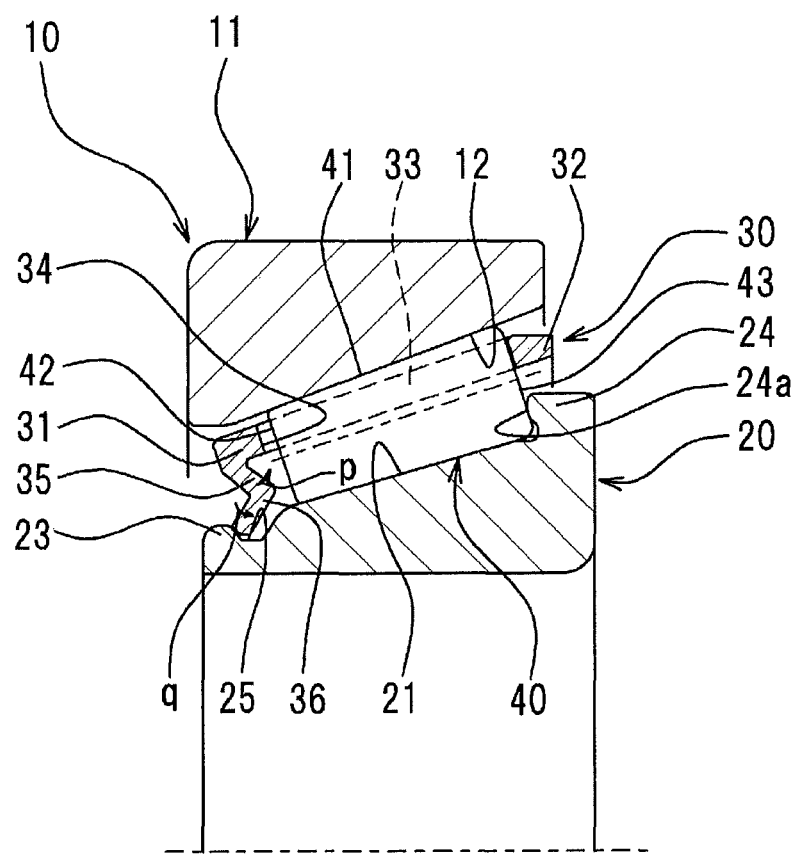
FIG. 2 is a sectional view of the conical roller bearing according to the embodiment of the invention which shows an operating state thereof.
Figure 3:
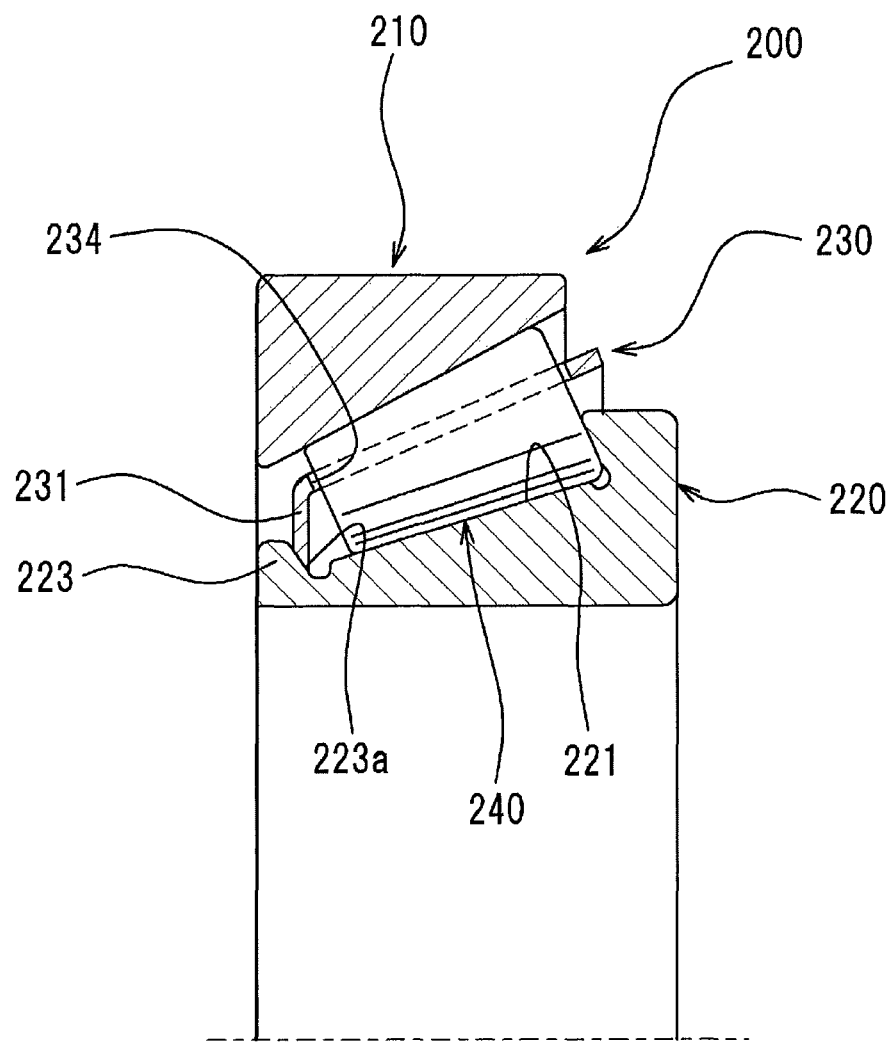
FIG. 3 is a sectional view of a conventional conical roller bearing with an annular grove.
Figure 4:
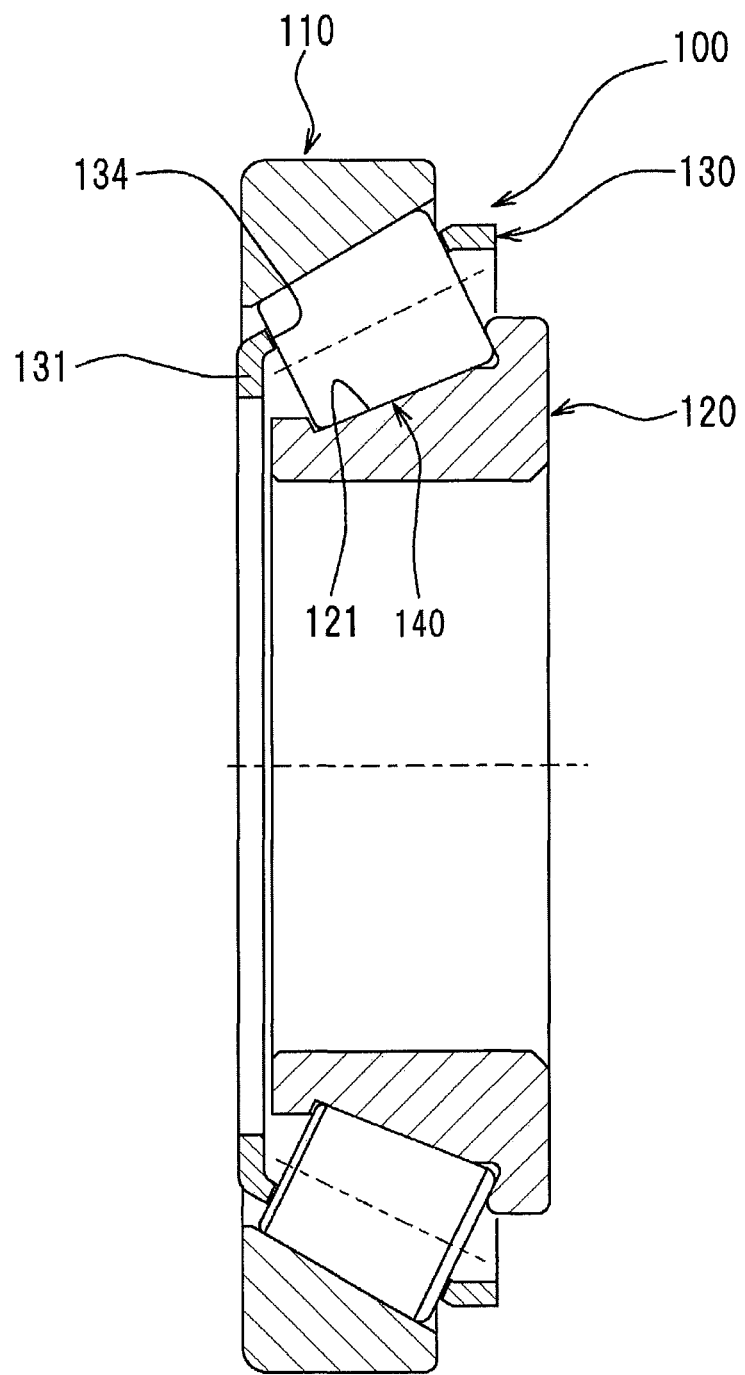
FIG. 4 is a sectional view of a conventional conical roller bearing without an annular groove.

As shown in FIGS. 1 to 2, a conical roller bearing 10 includes an outer ring 11 having a ring shape, an inner ring 20 having a ring shape which is disposed on an inner circumferential side of the outer ring 11, a ring-shaped cage 30 which is disposed between the outer ring 11 and the inner ring 20, and a plurality of conical rollers 40 which are individually held in pockets 34 of the cage 30. The outer ring 11, the inner ring 20, the cage 30 and the conical rollers 40 are all formed of a metallic material, and in particular, iron-based materials are used well.

An outer-ring-side raceway surface 12 is formed on an inner circumference of the outer ring 11 so as to be inclined relative to an axis of the outer ring 11.

An inner-ring-side raceway surface 21 is formed on an outer circumference of the inner ring 20 so as to be inclined relative to an axis of the inner ring 20. Additionally, on the outer circumference of the inner ring 20, a large-diameter-side end portion 24 is formed on a large-diameter side across the inner-ring-side raceway surface 21 so as to protrude radially outwards, and a annular groove 25 is formed on a small-diameter side across the inner-ring-side raceway surface 21. Further, a small-diameter-side end portion 23 is formed on the outer circumference of the inner ring 20 in a position lying closer to the small-diameter side than the annular groove 25. An outer circumference of the small-diameter-side end portion 23 has a surface which is provided substantially on an extension of the inner-ring-side raceway surface and parallel to the axis of the inner ring 20.

A large-diameter-side end face 24a is formed on an end face of the large-diameter-side end portion 24 which lies to face the conical rollers 40 so as to be brought into contact with large-diameter-side end faces 43, which will be described later, of the conical rollers 40.

The cage 30 is made up of a first annular portion 31 which has a ring shape and which is small in diameter, a second annular portion 32 which has a ring shape and which is large in diameter, pillar portions 33 which connects the first annular portion 31 with the second annular portion 32, and an erected portion which extends radially inwards from the first annular portion 31.

The pillar portions 33 are provided circumferentially at equal intervals, and a pocket 34 is defined between the two pillar portions 33, the first annular portion 31 and the second annular portion 32. Thus, there are provided pocket portions 34 which are arranged circumferentially at equal intervals, and the conical rollers 40 are individually held in the pockets 34 in a rolling fashion.

The erected portion includes a first inclined portion 35 which is inclined towards the conical rollers 40 while extending from the first annular portion 31 towards the annular groove 25 and a second inclined portion 36 which is inclined towards the small-diameter-side end portion 23 while extending from the first inclined portion 35 towards the annular groove 25. The second inclined portion 36 extends radially inwards to a position where the second inclined portion 36 can be brought into engagement with the annular groove 25 in an axial direction of the inner ring 20.

The cage 30 is formed by pressing a circular metal plate into a cup shape. Then, a bottom of the cup is cut out, and following this, a cylindrical portion of the cup is also cut out so as to form the pockets 34. Then, the erected portion is bent so as to form the first inclined portion 35 and the second inclined portion 36.

The conical roller 40 has a shape which results from cutting off a top portion of a circular cone. The conical roller 40 has a rolling surface 41 which rolls on the outer-ring-side raceway surface 12 and the inner-ring-side raceway surface 21, a small-diameter-side end face 42 which is formed on an end face of the conical roller 40 at a small-diameter side, and a large-diameter-side end face 43 which is formed on an end face of the conical roller 40 at a large-diameter-side.

Next, the assembling of the constituent parts into the conical roller bearing 10 will be described based on the configuration that has been described above.

The inner ring 20 is disposed concentrically with a perpendicular axis, and the conical rollers 40 are disposed on the inner-ring-side raceway surface 21 to be positioned around the axis of the inner ring 20. The conical rollers 40 are disposed at equal intervals around the axis of the inner ring 20, and the cage 30 is fitted on an outer circumferential side of the conical rollers 40 which are arranged into a ring configuration. The conical rollers 40 are fitted partially in the pockets 34 of the cage 30, and when the cage 30 is moved axially towards the large-diameter-side end portion 24, the erected portion rides over the small-diameter-side end portion while being deflected to thereby be brought into engagement with the annular groove 25. Then, the conical rollers 40 are completely fitted in the pockets 34 at the same time as the erected portion fits in the annular groove 25. When the erected portion is deformed, the erected portion is bent in a direction indicated by an arrow p at a root of the first inclined portion 35 and is bent in a direction indicated by an arrow q at a root of the second inclined portion 36. Then, a radially inner side distal end of the second inclined portion moves radially outwards, so that the erected portion can ride over the small-diameter-side end portion 23.

Thus, the erected portion is bent at the root of the first inclined portion 35 and is also bent at the root portion of the second inclined portion 36 in the way described above. Therefore, there are no fears that the erected portion is damaged. As long as the erected portion is kept fitting in the annular groove 25, the inner ring 20, the conical rollers 40 and the cage 30 can be prevented from being disassembled, whereby those constituent parts can be fitted together into an assembly. When the conical rollers 40 move towards the small-diameter-side end portion 23 so as to attempt to be disengaged from the inner ring 20, the erected portion is bent at the root of the first inclined portion 35 and at the root of the second inclined portion 36. However, this bending action of the erected portion differs from the bending action described above in that the radially inward distal end of the second inclined portion 36 is bent in the direction indicated by the arrow q. Because of this, there is provided an advantage that the erected portion is made difficult to be dislodged from the annular groove 25.

Next, the function of the conical roller bearing 10 will be described based on the configuration described above.

With the inner ring 20 rotating relative to the outer ring 11, the conical rollers 40 move in the same direction as the rotational direction of the inner ring 20 while rolling on the outer-ring-side raceway surface 12 and the inner-ring-side raceway surface 21. The cage 30 rotates in the same direction as the direction in which the inner ring 20 rotates as a result of the conical rollers 40 rolling on the raceway surfaces.

When an axial thrust force is applied to the inner ring 20, the large-diameter-side end faces 43 of the conical rollers 40 are brought into contact with the large-diameter-side end face 24a, and further, the thrust force is applied to the outer ring 11 via the conical rollers 40.

As described in the above, the conical roller bearing 10 according the embodiment of the invention includes: the outer ring 11 having ring shape; the inner ring 20, having ring shape, and disposed on the inner circumferential side of the outer ring; the cage 30, disposed between the outer ring 11 and the inner ring 20, and including a plurality of pockets 34 arranged circumferentially at equal intervals; and a plurality of conical rollers 40, disposed individually in the pockets 34. The outer ring 11 includes on the inner circumference thereof the outer-ring-side raceway surface 12 on which the conical rollers 40 roll. The inner ring 20 includes the inner-ring-side raceway surface 21 on which the conical rollers 40 roll on the outer circumference thereof. The outer ring 11 includes the small-diameter-side end portion 23 which is provided at the small-diameter side across the inner-ring-side raceway surface 21, and the large-diameter-side end portion 24 which is provided at the large-diameter side across the inner-ring-side raceway surface 21. The cage 30 includes the first annular portion 31 which has ring shape and is provided in a position corresponding to the small-diameter-side end portion 23 on one side of the pockets 34 in the axial direction of the inner ring 20, the second annular portion 32 which has ring shape and is provided in a position corresponding to the large-diameter-side end portion 24 on the other side of the pockets 34 in the axial direction, and the pillar portions 33 which are provided individually on circumferential both sides of the pockets 34. The conical rollers 40 are individually brought into engagement with the pockets 34 in a position lying further radially outwards than the rotational center of the conical rollers 40. The inner ring 20 includes the annular groove 25 between the inner-ring-side raceway surface 21 and the small-diameter-side end portion 23. The cage 30 includes the erected portion which extends from the first annular portion 31 towards the annular groove 25. The erected portion includes the first inclined portion 35 which is inclined towards the conical rollers 40 while extending from the first annular portion 31 towards the annular groove 25, and the second inclined portion 36 which is inclined towards the small-diameter-side end portion 23 while extending from the first inclined portion 35 towards the annular groove 25. The second inclined portion 36 is configured to be brought into engagement with the annular groove 25 in the axial direction of the inner ring 20.

The invention is not limited to the embodiment described heretofore at all, and hence, the invention can, of course, be carried out in various forms without departing from the spirit and scope of the invention.

In the embodiment described above, the cage 30 is formed of an iron-based metal material. However, as another embodiment, the cage 30 may be formed of a resin material.

According to the invention, it is possible to provide the conical roller bearing which is free from a limitation on the material of the case to thereby be made free from fears that the cage fails when it rides over the small-diameter-side end portion of the inner ring.

What is claimed is:

1. A conical roller bearing comprising:

an outer ring having ring shape;

an inner ring, having ring shape, and disposed on an inner circumferential side of the outer ring;

a cage, disposed between the outer ring and the inner ring, and including a plurality of pockets arranged circumferentially at equal intervals; and a plurality of conical rollers, disposed individually in the pockets, wherein the outer ring includes on an inner circumference thereof an outer-ring-side raceway surface on which the conical rollers roll, the inner ring includes an inner-ring-side raceway surface on which the conical rollers roll on an outer circumference thereof, a small-diameter-side end portion which is provided at a small-diameter side across the inner-ring-side raceway surface, and a large-diameter-side end portion which is provided at a large-diameter side across the inner-ring-side raceway surface, the cage includes a first annular portion which has a ring shape and is provided in a position corresponding to the small-diameter-side end portion on one side of the pockets in an axial direction of the inner ring, a second annular portion which has a ring shape and is provided in a position corresponding to the large-diameter-side end portion on the other side of the pockets in the axial direction, and pillar portions which are provided individually on circumferential both sides of the pockets, the conical rollers are individually brought into engagement with the pockets in a position lying further radially outwards than a rotational center of the conical rollers, the inner ring includes an annular groove between the inner-ring-side raceway surface and the small-diameter-side end portion, the cage includes an erected portion which extends from the first annular portion towards the annular groove, the erected portion includes a first inclined portion which is inclined towards the conical rollers while extending from the first annular portion towards the annular groove, and a second inclined portion which is inclined towards the small-diameter-side end portion while extending from the first inclined portion towards the annular groove, the second inclined portion is configured to be brought into engagement with the annular groove in the axial direction of the inner ring, and a radial void is included between the first annular portion and the first inclined portion.

\* \* \* \* \*